May 22, 1928. 1,670,750
J. T. SIMPSON
MIXING MACHINE
Filed June 28, 1926 6 Sheets-Sheet 6
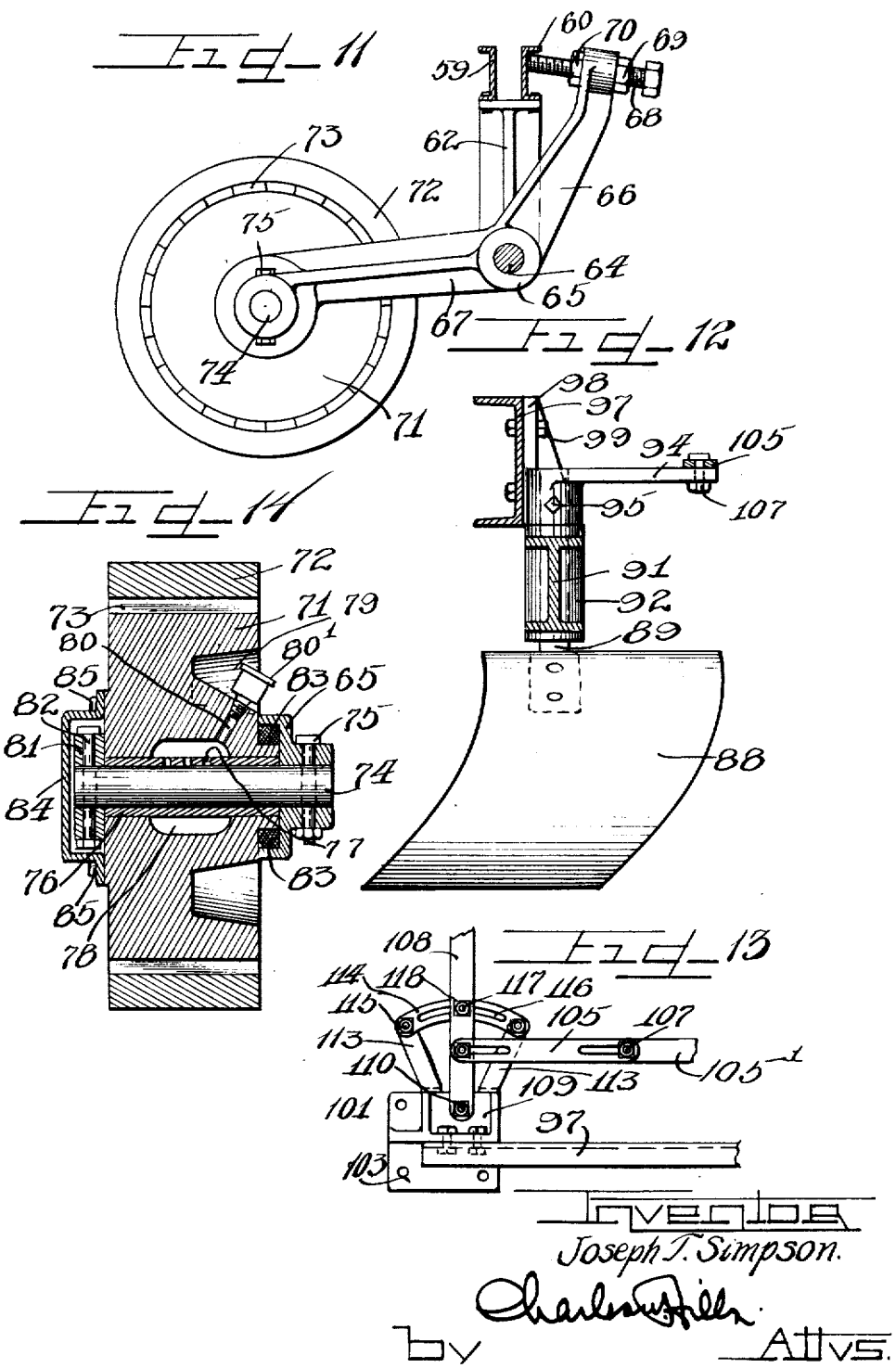

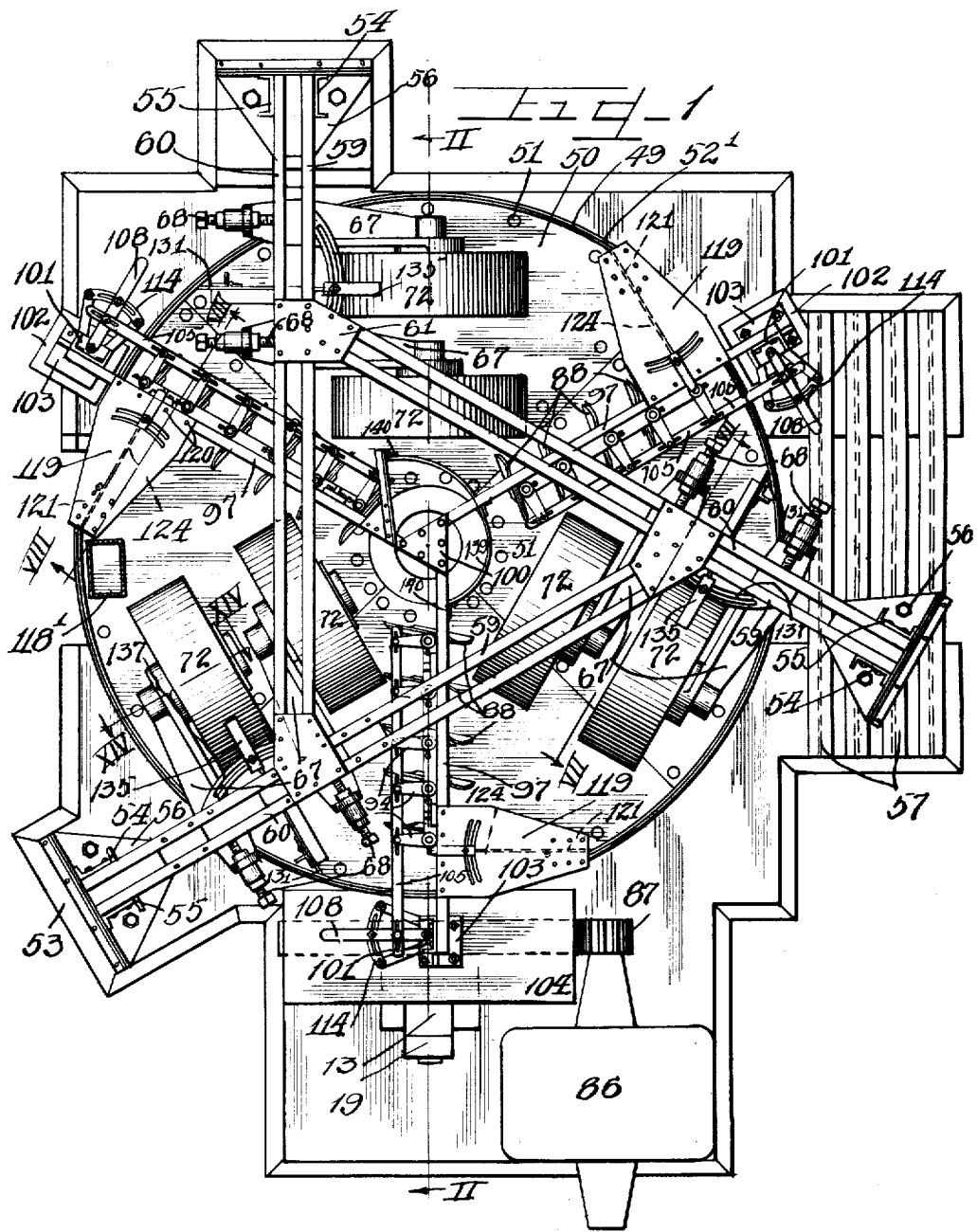

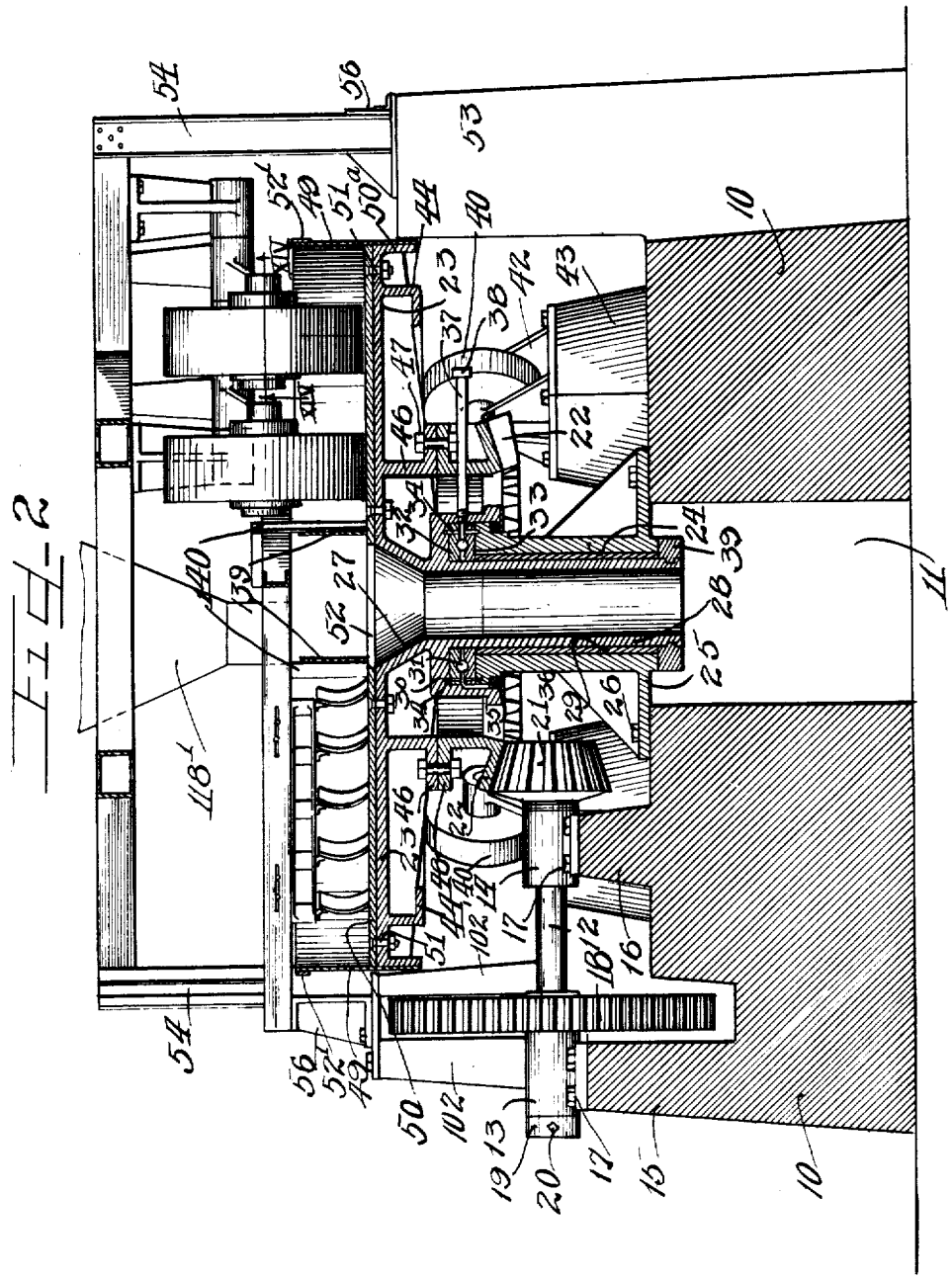

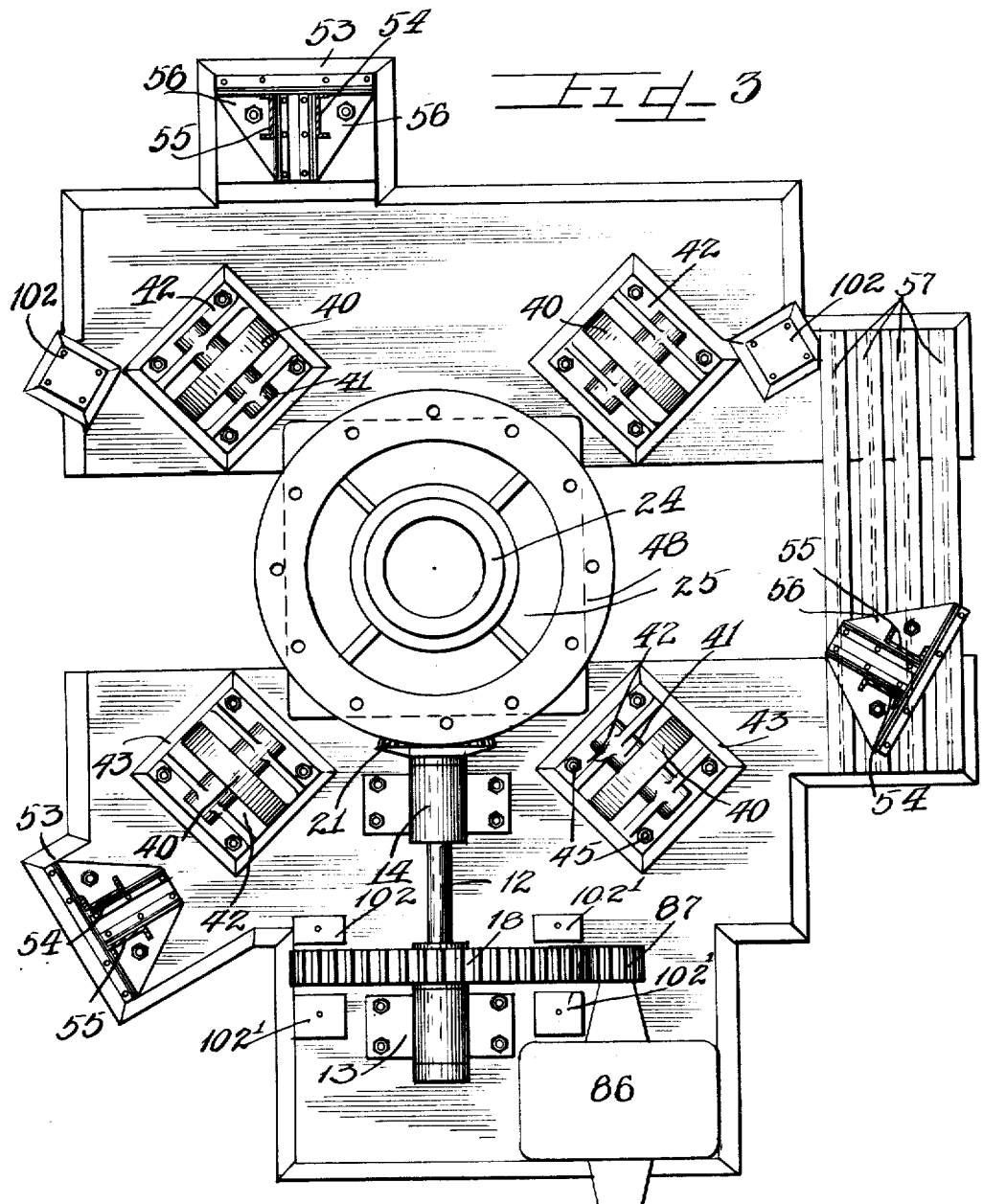

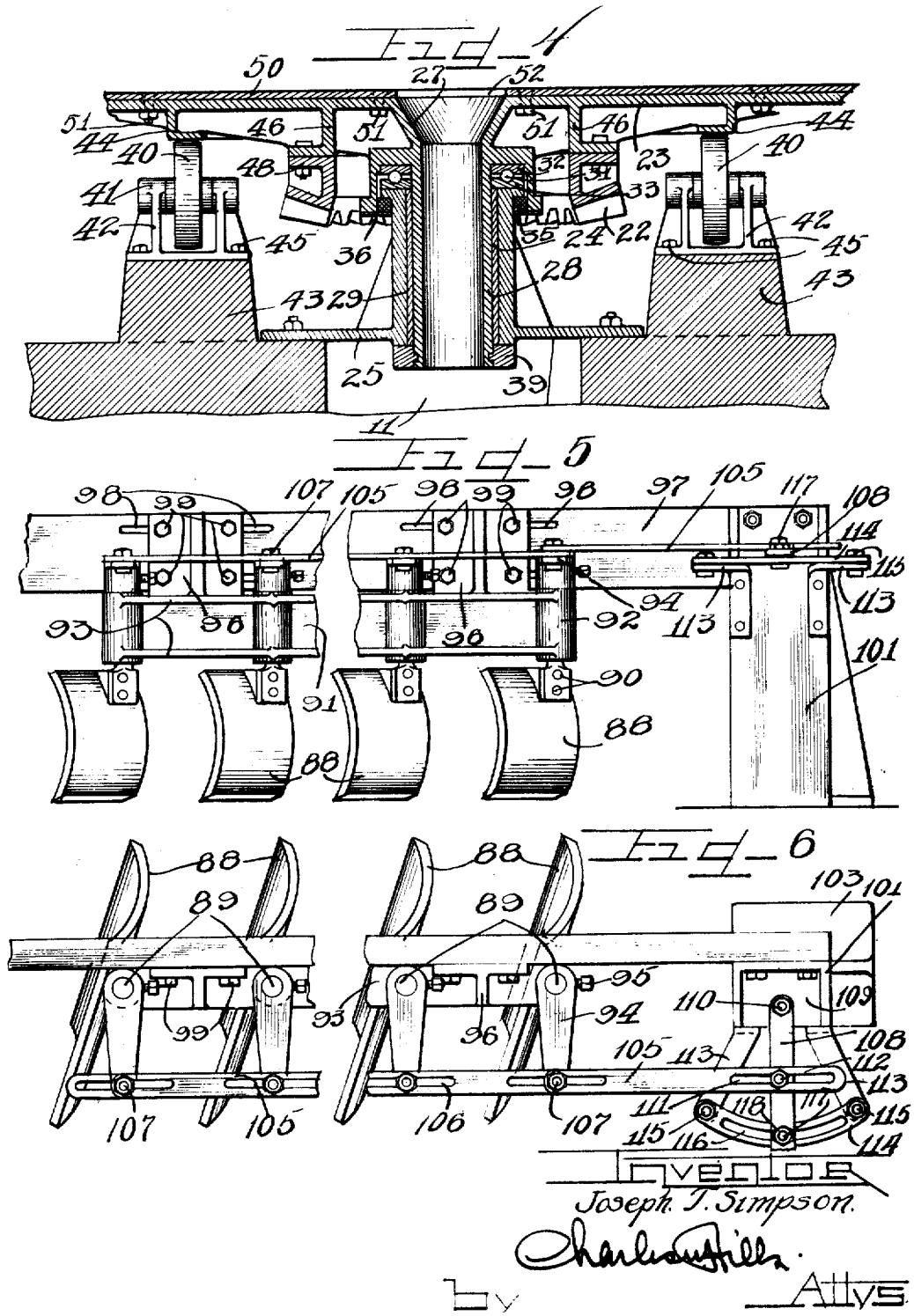

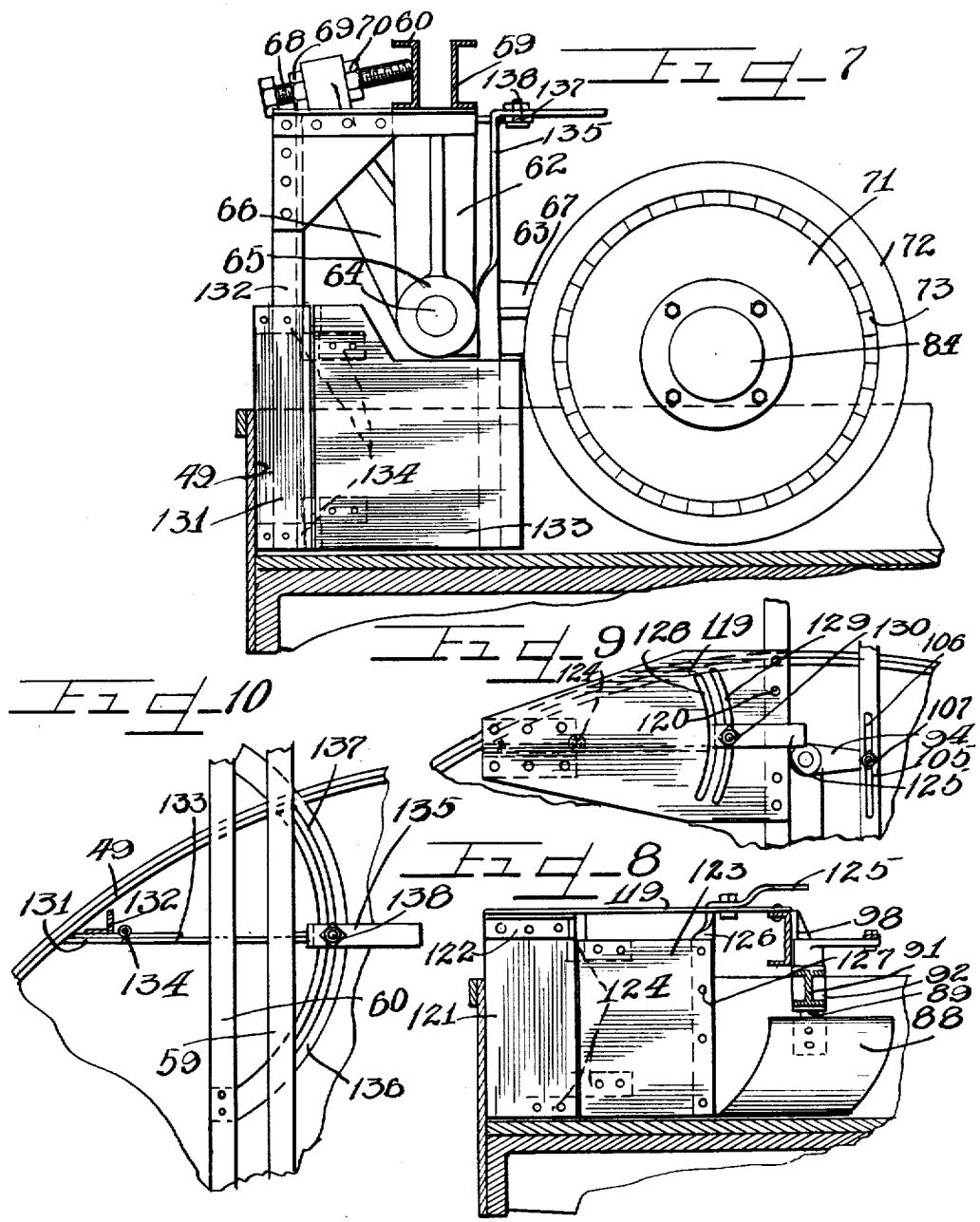

Patented May 22, 1928.

1,670,750

UNITED STATES PATENT OFFICE.

JOSEPH T. SIMPSON, OF CHICAGO, ILLINOIS.

MIXING MACHINE.

Application filed June 28, 1926. Serial No. 118,967.

This invention relates to mixing machines, and more particularly to a sand mixing machine, although it may be employed with equal advantage for other purposes.

It contemplates more especially the provision of a novel continuous feed and discharge mixing machine wherein the material is gradually moved or directed along a spiral or other predetermined path toward a discharge opening contra to the effect of centrifugal force produced by the rotating mechanism.

Foundry sands must necessarily be properly prepared in order to permit the production of castings having the desired surface finish, thereby decreasing the percentage of defective castings to a minimum.

To produce such a sand, it is highly desirable to employ a mixing machine wherein the various ingredients are effectively distributed, intimately mixed and mulled, and continuously discharged at a rate proportional to the quantity of material fed thereto. This results in maximum sand production at a minimum cost.

One object of the present invention is to improve the operation and construction of machines of the character mentioned.

Another object is to provide an efficient, continuous feed and continuous discharge mixing machine.

Still another object is to provide means to selectively vary the time and degree of mixing.

A further object is to provide a machine wherein the contents thereof are gradually moved along a spiral or other predetermined path in a direction opposed to the effect of inertia or centrifugal force imparted thereto by the movement thereof.

A still further object is to provide means whereby the rate of mixing may be conveniently varied and controlled both as to capacity and quality of mixture.

Still another object is to provide means to control the character of the mix to meet varied requirements.

Other objects and advantages will appear from the following description of an illustrated embodiment of the present invention.

In the drawings;

Figure 1 is a plan view of a machine embodying features of the present invention.

Figure 2 is a sectional view in elevation taken substantially along line II—II of Figure 1, with parts of the super-structure removed to clarify the showing.

Figure 3 is a plan view of the sub-structure of this machine.

Figure 4 is a fragmentary sectional view in elevation of the sub-structure and pan actuating mechanism.

Figure 5 is a fragmentary view in elevation of the super-structure of the machine shown in Figure 1.

Figure 6 is a plan view of the structure shown in Figure 5.

Figure 7 is a fragmentary sectional view taken substantially along line VII—VII of Figure 1.

Figure 8 is a fragmentary sectional view taken substantially along line VIII—VIII of Figure 1.

Figure 9 is a fragmentary plan view of the structure shown in Figure 8.

Figure 10 is a fragmentary plan view of a deflecting apron shown in Figure 1.

Figure 11 is a view in elevation of a muller and rocker arm shown in Figure 7.

Figure 12 is an enlarged view in elevation of a plow together with supporting means therefor.

Figure 13 is a fragmentary plan view of a plow adjusting lever and connecting bar shown in Figure 1.

Figure 14 is a sectional view taken substantially along line XIV—XIV of Figures 1 and 2.

The machine selected for illustration is, in this instance, mounted on a suitable base 10 which is provided with a plurality of piers conveniently arranged and of varying heights to firmly support the associated parts of the machine to be hereinafter described. Obviously the base or foundation may be of any desirable material such as concrete, metal or the like, which is provided with a channel 11 therethrough within which any conveyor of suitable construction may be placed to receive thereon and carry away material discharged from the machine.

A drive shaft 12 is journalled in suitable bearings 13 and 14 supported on the piers 15 and 16 which are of the same height to maintain the shaft 12 in a horizontal position normal to the channel 11. As shown, the bearings 13 and 14 are secured to the piers 15 and 16 in the usual manner such as by the bolts 17. A spur gear 18 of any appropriate size, is keyed or otherwise secured to the shaft 12 adjacent the bearing 13. To prevent axial movement of the shaft 12, the free extremity thereof is provided with a collar 19 secured thereon by means of a set screw 20 so that axial movement in either direction is prevented by the gear 18 and the collar 19. The other extremity of the shaft 12 is provided with a bevel pinion 21 which is in mesh with an annular bevel gear 22 secured in any appropriate manner to a horizontal table or pan base 23 which, in this instance, is rotatably mounted to revolve about the axis thereof in a manner to be hereinafter described.

A vertically disposed main cylindrical bearing 24 having webbed flanges 25 near one end thereof is superposed above the channel 11 and secured to the base 10 by means of the bolts 26 projecting through the flanges 25 and anchored within the base 10 in the usual manner. The table 23 is provided with a central conical aperture 27 which communicates with a correspondingly apertured cylindrical extension or tubular shaft 28 journalled in the bearing 24 and projecting from the lower end thereof. The bearing 24, in this instance, is lined with a sleeve 29 composed of any suitable bearing metal such as brass, so that friction between the relatively rotating parts, is reduced to a minimum. The table 23 is supported near the axis thereof by virtue of a cup-shaped flange 30 formed integral with the shaft 28 immediately below the conical aperture 27 to receive bearings 31 of standard construction, having the usual raceways 32 and 33 interposed between the bearing 24 and the flange 30 to permit free rotative movement therebetween. The raceways 32 and 33, which are associated with the ball bearing 31 in the usual manner, are secured against movement to the confronting faces of flange 30 and the bearing 24 by means of the pins 34 which retain the cooperating parts in position. A packing ring 35 is interposed between the adjacent peripheries of the flange 30 and the bearing 24, and is retained therebetween by means of a collar 36 secured in any suitable manner to the under edge of the flange 30 and to an appropriate shoulder on the bearing 24, so that the entrance of sand or dust between the co-acting moving parts in the bearing is prevented. The lubricant, such as oil or the like, is injected in the bearing through a radially extending, suitable pipe 37 in threaded engagement with a vertical wall of the flange 30 and communicating with the interior thereof. The pipe 37 is provided with a suitable union 38 at the extremity thereof so that a pump or the like may be connected thereto to force oil therethrough. In order to guard against accidental upward vertical movement of the table 23, and to prevent the leakage of oil, a split collar 39 is threaded or otherwise secured to the free extremity of the shaft 29 thereby insuring constant alignment of the shaft within the bearing.

Auxiliary table supporting means are provided to partially relieve the bearing 31 of the greatest portion of the load which facilitates the carrying of unusually large loads by the table. The auxiliary means, in this instance, comprises a plurality of traction wheels 40, in this instance four, having radially related axles journalled in standard bearings 41 rigidly fixed to the brackets 42 supported on the piers 43 of suitable height to effect frictional engagement of the wheels 40 with a circular track 44 suspended from the under side of the table 23. It is to be noted that the traction wheels 40 rotate on axes disposed radially of the axis of the table so that rotation of the latter will cause corresponding rotation of the traction wheels which materially assist in sustaining the loads and insure complete stability of the table under all conditions. The brackets 42 are secured to the piers 43 by means of the bolts 45 which are imbedded therein and project through each corner of the bracket in an obvious manner. Intermediate the main bearing 24 and the track 44, the pan base is provided with a depending flange 46 to which is secured in any appropriate manner, such as by the bolts 47, a correspondingly shaped flange 48 which carries the annular gear 22 hereinbefore described.

A material container or pan which is rigidly secured to the pan base 23, comprises a cylindrical rim 49 bolted or otherwise fastened to an outer peripheral flange 50 of the pan base 23 so as to project upwardly therefrom to define a circular container of suitable height to carry any desired quantity of material therein. As shown, the table 23 has a lining, in this instance a disk 50ª, separate therefrom and secured thereto by means of the countersunk bolts 51. The disk 50ª is provided with a central aperture 52 in alignment with the conical aperture 27 of the table 23 so that material confined thereon may be discharged therethrough and onto a conveyor (not shown) positioned within the channel 11. A ring 52' secured to the upper edge of the rim 49 renders the latter more rigid so as to withstand the stresses thereon by reason of centrifugal action of the material.

In the machine shown, the super-structure is supported from the base 10 by means of the piers 53 which receive thereon the vertically disposed channelled standards 54 and 55, preferably of structural steel. The spaced standards 54 and 55 are anchored thereto by means of the brackets 56 in a customary manner. It is to be noted that a plurality of cross beams 57 supported by the base 10, span the channel 11 at one end thereof to support one of the three sets of standards to avoid the necessity of having a pier obstruct the channel. A supporting frame comprising parallel structural steel beams 59 and 60, is arranged in a horizontal plane with each pair of beams 59 and 60, in this instance three, riveted or otherwise secured at one end thereof to the vertical standards 54 and 55, respectively, and at their other extremity to the next succeeding pair intermediate the ends thereof by means of appropriate mounting plates 61 preferably riveted thereto in a manner to present, in this instance, a triangular central portion with extending sides.

Depending from each set of beams 59 and 60 in proximity to the periphery of the container 49, are a pair of fulcrum bearings 62 having an apertured extremity 63 (Figure 7) within which are fixed the pins 64 which rockably support a bell crank or rocker arm 65 (Figure 11) comprising angularly related arms 66 and 67. As shown, the extremity of the arm 66 is provided with a bore disposed normal to the pin 64, which is adapted to receive therein a threaded adjusting screw 68 having threaded nuts 69 and 70 on either side of the arm 66 whereby the rocker arm is pivotally adjustable in any desired position (Figure 11). Journalled in the other apertured extremity of each bell crank 65 is a muller 71 which is pivotally suspended within the pan 49 so as to be conveniently adjustable in a vertical direction. The mullers, in this instance, are provided in pairs which are in axial, radial alignment at spaced angular intervals to effectively cover a comparatively wide circumferential path. In view of the fact that the surface thereof is subjected to unusual wear in its rotary action, each muller is provided with a hardened annular rim 72 which is secured to the body portion thereof by means of wedges 73 interposed therebetween to rigidly hold the parts thereof against relative movement. This arrangement affords a convenient means of replacing the rim at little expense whenever necessary. As shown, the mullers 71 are journalled near the extremity of the arm 67 of the bell crank 65 on a pin 74 which is secured therein by means of a diametrically projecting bolt 75 (Figure 14). To render the muller 71 freely rotatable on the pin 74 without causing excessive wear between the coacting parts, a bushing 76 which is fixed within the bore of the muller, is apertured as at 77 for lubricating purposes, so as to freely revolve on the pin 74. Each muller is chambered as at 78 to facilitate the lubrication of the pin 74 through a circumferential groove 79 provided in a lateral face thereof to communicate with the apertures 77 through a port 80 which is provided with an oil cup 80'. The other extremity of the pin 74 is provided with a collar 81 held thereon by means of the bolt 82. Leakage of the lubricant along the pin 74 is prevented by means of a packing ring 83 interposed between the appropriately flanged rocker arm mounting and the face of the muller 71. The other end of the pin 74 is shielded by means of a cap plate 84 fixedly secured to the lateral face of the muller 71 in any suitable manner, such as by the cap screws 85, thereby shielding the moving cooperating elements from sand and dust. It is to be noted that for the present purpose, the mullers never contact with the bottom of the pan and the minimum distance therebetween is preferably one-fourth of an inch, since their purpose is to mull and not grind the sand and other constituents of the mixture.

To guide the material in a predetermined path within the container, a novel and effective mechanism is provided to preferably urge the material along a selectively variable spiral path toward the center of the pan to effect discharge through the bore of the axial shaft 24. In the machine shown, the pan is continuously rotated by means of a variable speed electric motor 86 secured to the base 10. A driving pinion 87 secured to the armature shaft of the motor, is in mesh with the gear 18 so that a peripheral urge is imparted to the material contained in the pan by the rotation thereof. In overcoming the peripheral urge produced by the effects of centrifugal force occasioned by the rotation of the container, the material is intimately mixed, kneaded and mulled in its travel toward the center in opposition to centrifugal force.

The mechanism for moving the material along a predetermined path, in this instance, comprises a plurality of concentrically spaced radially related series of plows 88 preferably comprising concavo-convexo substantially rectangular plates having a vertically disposed cylindrical shank 89 secured near one corner thereof in any suitable manner such as by the rivets 90. The shanks 89 thereof are, in this instance, rotatably mounted and supported from the plow beams 91 each having spaced thereon integral, vertically extending bearings 92, which are provided intermediate the ends thereof with a pair of ribs 93 to reinforce the beams which are subjected to excessive stresses.

Detachably secured to the free extremity of each shank 89 which extends beyond the bearings 92, is a crank arm 94 which has a set screw 95 projecting radially therethrough to engage the shank 89 so that each plow may be angularly adjusted individually. The plow beams 91 are each provided with spaced integral brackets 96 which are detachably secured to a horizontal support 97 having appropriate slots 98 to receive the bolts 99 associated with the brackets 96 and the slots 98 so that each series of plows may be moved longitudinally of the support 97. It is to be noted that in this instance there are three series of plows each depending from the intersecting beams 97 riveted or otherwise secured at one extremity along the sides of a triangular center plate 100 with the other extremity of each secured to and supported by the standards 101 vertically fixed upon the piers 102 by means of the brackets 103 of standard construction. One of the standards 101 which is in proximity to the motor 86, is mounted upon a suitable platform 104 anchored to the piers 102' disposed on both sides of the spur gear 18 so that the platform 104 may be superposed above the gear without interfering with the operation thereof. In the present showing, the plows are suspended within the container intermediate the mullers to turn over the material and guide the latter along a predetermined path preferably along a spiral path toward the center of the table.

The crank arms 94 of each series are adjustably connected to a bar 105 which is provided with spaced slots 106 to slidably receive a bolt 107 projecting through each slot and arm 94 so that each series of plows may be oscillated as a unit or individually adjusted by changing the position of the stud in the slots 106 or by changing the relative position of the shank 89 with respect to the arm 94 by virtue of the set screw 95. It will thus be apparent that the angularity of the plows may be individually adjusted or they may be oscillatable as a unit as well as moved longitudinally of the support or radially in respect to the container to assume any desired position. The plows of each series are preferably staggered with respect to each other so that the material within the container will be moved through a spiral path of any desired pitch, thereby controlling its rate of travel towards the center which may also be varied by rotating the container at any desired speed.

Reciprocation of the connecting bars 105 in each instance is effected by means of a lever 108 pivotally secured at one end thereof to a horizontal plate 109 rigidly fixed to each of the standards 101 near the top thereof. The levers pivot about the bolts 110 provided in the plates 109 for that purpose. The bar 105 is provided with a slot 111 at the end thereof to pivotally engage a stud 112 secured to the lever 108 at a point removed from the pivoted end thereof. This slot permits radial adjustment of each series of plows. A quadrant constituting the angularly related members 113 and an arcuate sector 114 secured thereto at the ends thereof by the bolts 115, cooperates with each lever 108 to adjust the throw thereof. The members 113 are riveted or otherwise secured to the standard 101 in a manner as shown in Figure 5. The sector 114 is provided with an arcuate slot 116 which slidably receives a bolt 117 adjustably secured to the lever 108 so that the latter may be moved and retained in any position within the limits of the slot 116, whereby the plows 88 may conveniently be arranged in any desired position by virtue of the nut 118 which is in threaded engagement with the bolt 117 to selectively maintain the lever against accidental movement. This construction affords a convenient adjustment of the plows as a unit, and although each series is individually adjusted, it is obvious that instrumentalities may be provided whereby all the plows may be oscillated by a unitary control.

The fact that the sand or other material is preferably fed into the container near the periphery thereof by any suitable means such as a chute 118', it is caused to impinge against the periphery thereof by virtue of the centrifugal force produced by the rotation of the container. In view thereof, it is essential or at least highly desirable to provide scrapers to engage the periphery of the pan so as to prevent the material from adhering thereto. Also, deflecting means, hereinafter to be described, are employed for guiding and diverting the material in the path of the plows and the mullers. To this end, each plow beam 97 is provided near the outer end thereof, with a mounting plate 119 secured thereto by the rivets 120 in superposed relation with respect to the periphery of the container or pan. A scraper 121 consisting of a metallic rectangular member is supported from the plate by reason of an angular bracket 122 so that the scraper 121 which is stationary, engages the periphery of the container. An apron 123 is pivotally secured to the inner vertical edge of the scraper 121 by means of the hinges 124 so that the former may be pivotally moved with respect to the latter to any desirable angular position to effect the diversion of material from the periphery of the container in the path of the plows 88. As described above, the plows are adjustable to any desirable position to affect the rate of discharge, and similarly the aprons 123 are also adjustable to effectively guide the material to the desired places, by means of a lever 125 which has a depending extension 126 secured to the edge of the apron 123 by the rivets 127. The lever 125 is guided in an arcuate groove 128 provided in the plate 119. Another groove 129 concentric with the groove 128 receives a bolt 130 secured to the lever 125 so that the latter may be retained against accidental movement in any position.

Another series of rim scrapers 131 are suspended from the superstructure by virtue of the angle bars 132 provided directly in front of each set of mullers so that the aprons 133 which are pivotally secured thereto at 134 in a manner similar to the scrapers previously described, are adjustable to guide the material in the path of the mullers. The aprons 133, in this instance, are likewise pivotally movable by virtue of a hand lever 135 which is secured in a manner similar to the hand lever 125 to their respective aprons 133 to move along a path defined by a quadrant 136 secured in any suitable manner to the overhanging beam 59. This quadrant is also provided with an arcuate groove 137 to receive a bolt 138 provided in the hand lever 135 to selectively adjust the apron 133 to any desired angular position. With the arrangement of parts above described, the motor or other prime mover 86 imparts continuous rotation at any desired speed to the container 49 in which material is continuously fed in any appropriate manner. The rotation or movement of the container imparts a peripheral urge or movement in one direction to the material by reason of, in this instance, centrifugal force, thereby tending to carry the material along the rim of the pan. The scrapers and aprons deflect the material in the path of the plows and mullers so that the former by virtue of their angular and staggered relation may guide the material along a predetermined spiral path contra to centrifugal force, thereby gradually and ultimately discharging the material, in the present embodiment, through the bore of the axial tubular shaft of the table. Thus the material is intimately mixed and thoroughly mulled and kneaded during its passage under the mullers until its gradual and continuous travel to the center or to a point removed from the periphery of the pan effects a discharge thereof onto a conveyor or other suitable means. A sheet iron apron 139 is preferably suspended from the frame, in this instance the plow beams 97, by means of the bars 140 in proximity to the axial discharge opening to direct the material therethrough.

It will be obvious that the rate of discharge is dependent, in the present instance, upon the velocity of rotation, and also upon the angular position of the plows which are individually adjustable as well as angularly movable as a unit so that the pitch of the spiral path defined by the plows may be varied to suit the needs of the material and the demands of the machine. It is to be noted that with a high speed of rotation, the discharge apparently will be less than at a slow speed in view of the fact that the centrifugal force is of greater magnitude at higher speeds thereby tending to retain the material near the rim of the container; however, since the impact against the plows is greatest in such cases, the material will be more thoroughly mixed, mulled and kneaded, and to effect a discharge equivalent to lower speeds it is only necessary to increase the angularity of the plows thereby correspondingly increasing the pitch of the spiral path along which the material moves. Since the linear velocity is greatest at points removed from the center, the angularity of the plows in that vicinity need be somewhat greater than those nearer the center, for the former must overcome a greater centrifugal force.

It will be apparent that a machine constructed in accordance with the present invention is highly efficient, durable and of maximum capacity by reason of its continuous operation whereby a continuous discharge of intimately mixed and mulled material is effected. Further, it is readily adjustable to meet the requirements of any commodity so as to produce the best results with any desired rate of discharge.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a mixer, a circular revolving material container, a radial series of material guiding means within said container, means for adjusting said guiding means radially, and means for angularly adjusting said guiding means.

2. In a mixer, a circular revolving material container, a plurality of angularly related series of concentrically spaced plows within said container, means for radially adjusting each series of plows, means for angularly adjusting each plow individually, and lever operated means to angularly adjust each series as a unit.

3. In a mixer, a revolving material container, a plurality of angularly related series of spaced plows within said container effective to direct the material along a spiral path toward the center of said container, a bar for selectively controlling the pitch of said spiral path, a lever for operating said bar, and mulling means intermediate each series of plows.

4. In a mixer, a revolving material container, a plurality of angularly related series of spaced plows within said container effective to direct the material along a spiral path toward the center of said container, lever operated bars for selectively controlling the pitch of said spiral path, mulling means intermediate each series of plows, and means to adjustably support said mulling means within said container.

5. The combination with a frame, of a revolving material container, revoluble mullers, and supporting means for said mullers, said supporting means including a pivotally mounted bell crank rocker arm, and an adjusting screw associated with said rocker arm and frame to vary the position of said mullers.

6. The combination with a frame, of a revolving material container, a series of spirally spaced plows suspended from said frame within said container, and means for selectively adjusting said series of plows as a unit, said means including a bar operatively connected to each plow, and a lever to actuate said bar.

7. The combination with a frame, of a revolving material container, a series of radially spaced plows suspended from said frame within said container, and means for selectively adjusting said series of plows as a unit, said means including a bar operatively connected to each plow, a lever to actuate said bar, and means to maintain said lever in any desired adjusted position.

8. The combination with a frame, of a material container, a support superposed radially of said container, a series of plows having vertically disposed shanks journalled in said support, a crank arm detachably secured to each shank, a bar pivotally connecting each crank arm, and a lever pivotally associated with said frame and bar to angularly adjust said plows.

9. The combination with a frame, of a material container, a support superposed radially of said container, a series of plows having vertically disposed shanks journalled in said support, a crank arm detachably secured to each shank, a bar pivotally connecting each crank arm, a lever pivotally associated with said frame and bar to angularly adjust said plows, a quadrant having an arcuate groove associated with said lever, and means on said lever engaging said slot to maintain said lever in any adjusted position.

10. The combination with a frame, of a material container, a series of supports superposed radially of said container, a series of radially spaced plows having vertically disposed shanks journalled in said supports, said plows of each series being staggered with respect to the plows of each other series to direct the material along a spiral path, means for angularly adjusting each plow individually, and mechanisms for changing the spacing of said plows.

11. The combination with a frame, of a rotatable material container, a series of stationary supports superposed radially of said container, a series of spaced plows having vertically disposed shanks journalled in said supports, said plows of each series being staggered with respect to the plows of each other series to direct the material along a spiral path, means for angularly adjusting each plow individually, and means for adjusting the concentric spacing of said plows.

12. The combination with a frame, of a material container, a series of supports superposed radially of said container, a series of concentrically spaced plows having vertically disposed shanks journalled in said supports, said plows of each series being staggered with respect to the plows of each other series to direct the material along a spiral path, means for angularly adjusting each plow individually, means for angularly adjusting the plows of each series as a unit, and means for adjusting the concentric spacing of said plows.

13. The combination with a frame, of a material container, a series of supports superposed radially of said container, a series of radially spaced plows having vertically disposed shanks journalled in said supports, said plows of each series being staggered with respect to the plows of each other series to direct the material along a spiral path, means for angularly adjusting each plow individually, means for angularly adjusting the plows of each series as a unit, means for adjusting the concentric spacing of said plows, and a variable speed driving means to direct the material along a spiral path defined by said plows.

14. The combination with a frame, of a revolving circular material container, guiding means for directing the material along a predetermined path, a scraper cooperating with the periphery of said container, and an adjustable apron pivoted on said scraper to direct the material in the path of said guiding means.

15. The combination with a revolving circular material container, of a plurality of mullers rotatably mounted within said container, an adjustable apron in said container to direct the material in the path of said mullers, and means for locking said adjustable apron in a set position.

16. The combination with a revolving material container, of a plurality of plows within said container to direct the material along a predetermined path, a scraper coacting with said container, and an adjustable apron connected with said scraper to direct the material in the path of said plows.

17. The combination with a revolving circular material container, of a scraper rigidly suspended within said container in engagement with the periphery thereof, and an apron pivotally associated with said scraper to divert the path of the material.

18. The combination with a frame, of a material container, a series of supports superposed radially of said container, a series of spaced plows having vertically disposed shanks journalled in said supports, and adjustable aprons associated with said container to guide the material in the path of said plows.

19. The combination with a frame, of a material container, a series of supports superposed radially of said container, a series of radially spaced plows having vertically disposed shanks journalled in said supports, a peripheral scraper rigidly suspended from each of said supports within said container, and an apron pivotally secured to said scraper to guide the material in the path of said plows.

20. The combination with a frame, of a material container, a series of supports superposed radially of said container, a series of spaced plows having vertically disposed shanks journalled in said supports, a peripheral scraper rigidly suspended from each of said supports within said container, an apron pivotally secured to said scraper to guide the material in the path of said plows, and means for adjusting said aprons.

21. The combination with a frame, of a material container, a series of supports superposed radially of said container, a series of spaced plows having vertically disposed shanks journalled in said supports, a peripheral scraper rigidly suspended from each of said supports within said container, an apron pivotally secured to said scraper to guide the material in the path of said plows, means for adjusting said aprons, said adjusting means comprising a lever fixed to said apron and disposed above said supports, a quadrant associated with said lever, and cooperating means on said lever and stud to maintain said apron in any desired position.

22. The combination with a revolving material container having an axial discharge opening, a plurality of adjustable plows within said container to direct the material along a continuous spiral path, a plurality of rotatable mullers within said containers, a series of peripheral scrapers, and aprons adjustably associated with said scrapers to individually direct the material in the path of said plows and mullers.

23. The combination with a base, of a vertically disposed bearing fixed thereon, a table, a central cylindrical apertured extension extending normally of said table journalled in said bearing, a centrally apertured container secured to said table, means to impart rotation to said table, and wheels interposed between said table and base to support said table.

24. The combination with a base, of a vertically disposed bearing fixed thereon, a table, a central cylindrical apertured extension extending normally of said table journalled in said bearing, a centrally apertured container secured to said table, means to impart rotation to said table, and traction wheels on said base to support said table.

25. The combination with a frame, of a revolving material container, a series of plows supported by said frame, said plows serving to move the material in said container, and means for changing the concentric spacing of said plows.

26. The combination with a frame, of a movable material container, a plurality of plows rotatively suspended from said frame within said container, means for adjusting the angularity of said plows individually, and mechanisms for independently adjusting said plows toward and away from one another.

In testimony whereof I have hereunto subscribed my name.

JOSEPH T. SIMPSON.

DISCLAIMER 1,670,750.—*Joseph T. Simpson*, Chicago, Ill. MIXING MACHINE. Patent dated May 22, 1928. Disclaimer filed April 7, 1933, by the assignee, *Herbert S. Simpson*, the patentee said Joseph T. Simpson, and the exclusive licensee, *National Engineering Company*, concurring.

Hereby enters a disclaimer limiting claim 25 of said patent as follows:

"No claim is made to the subject-matter of claim 25 except in a machine in which the plows meet the centrifugally moving sand and turn the sand inwardly towards a center discharge opening in the pan, and during which operation the sand is mulled by freely rotating mullers which are adapted to rock while mulling is being performed."

[*Official Gazette May 9, 1933.*]

material container, a series of supports superposed radially of said container, a series of radially spaced plows having vertically disposed shanks journalled in said supports, a peripheral scraper rigidly suspended from each of said supports within said container, and an apron pivotally secured to said scraper to guide the material in the path of said plows.

20. The combination with a frame, of a material container, a series of supports superposed radially of said container, a series of spaced plows having vertically disposed shanks journalled in said supports, a peripheral scraper rigidly suspended from each of said supports within said container, an apron pivotally secured to said scraper to guide the material in the path of said plows, and means for adjusting said aprons.

21. The combination with a frame, of a material container, a series of supports superposed radially of said container, a series of spaced plows having vertically disposed shanks journalled in said supports, a peripheral scraper rigidly suspended from each of said supports within said container, an apron pivotally secured to said scraper to guide the material in the path of said plows, means for adjusting said aprons, said adjusting means comprising a lever fixed to said apron and disposed above said supports, a quadrant associated with said lever, and cooperating means on said lever and stud to maintain said apron in any desired position.

22. The combination with a revolving material container having an axial discharge opening, a plurality of adjustable plows within said container to direct the material along a continuous spiral path, a plurality of rotatable mullers within said containers, a series of peripheral scrapers, and aprons adjustably associated with said scrapers to individually direct the material in the path of said plows and mullers.

23. The combination with a base, of a vertically disposed bearing fixed thereon, a table, a central cylindrical apertured extension extending normally of said table journalled in said bearing, a centrally apertured container secured to said table, means to impart rotation to said table, and wheels interposed between said table and base to support said table.

24. The combination with a base, of a vertically disposed bearing fixed thereon, a table, a central cylindrical apertured extension extending normally of said table journalled in said bearing, a centrally apertured container secured to said table, means to impart rotation to said table, and traction wheels on said base to support said table.

25. The combination with a frame, of a revolving material container, a series of plows supported by said frame, said plows serving to move the material in said container, and means for changing the concentric spacing of said plows.

26. The combination with a frame, of a movable material container, a plurality of plows rotatively suspended from said frame within said container, means for adjusting the angularity of said plows individually, and mechanisms for independently adjusting said plows toward and away from one another.

In testimony whereof I have hereunto subscribed my name.

JOSEPH T. SIMPSON.

DISCLAIMER 1,670,750.—*Joseph T. Simpson*, Chicago, Ill. MIXING MACHINE. Patent dated May 22, 1928. Disclaimer filed April 7, 1933, by the assignee, *Herbert S. Simpson*, the patentee said Joseph T. Simpson, and the exclusive licensee, *National Engineering Company*, concurring.

Hereby enters a disclaimer limiting claim 25 of said patent as follows:

"No claim is made to the subject-matter of claim 25 except in a machine in which the plows meet the centrifugally moving sand and turn the sand inwardly towards a center discharge opening in the pan, and during which operation the sand is mulled by freely rotating mullers which are adapted to rock while mulling is being performed."

[*Official Gazette May 9, 1933.*]